United States Patent [19]

Phlipot et al.

[11] Patent Number: 4,723,567
[45] Date of Patent: * Feb. 9, 1988

[54] GAS FLOW CONTROL VALVE

[75] Inventors: James R. Phlipot; Steve R. Pinkston, both of St. Louis; Harry Nurre, St. Louis County, all of Mo.

[73] Assignee: Essex Industries, Inc., St. Louis, Mo.

[*] Notice: The portion of the term of this patent subsequent to Feb. 17, 2004 has been disclaimed.

[21] Appl. No.: 944,590

[22] Filed: Dec. 22, 1986

Related U.S. Application Data

[62] Division of Ser. No. 756,710, Jul. 19, 1985, Pat. No. 4,643,215.

[51] Int. Cl.⁴ ............................................. F16K 51/00
[52] U.S. Cl. ......................................... 137/315; 137/356; 137/614.11; 251/208; 251/297; 251/367
[58] Field of Search .................. 251/208, 297, 367; 137/356, 614.11, 15, 315

[56] References Cited

U.S. PATENT DOCUMENTS

| | | | |
|---|---|---|---|
| 2,290,783 | 7/1942 | Turpin | 251/208 |
| 2,767,019 | 10/1956 | Manville | 137/356 |
| 3,127,071 | 3/1964 | Bingham | 251/208 |
| 4,235,258 | 11/1980 | Uno et al. | 251/297 |
| 4,366,947 | 11/1983 | Voege | 251/208 |

FOREIGN PATENT DOCUMENTS 171192 11/1921 United Kingdom ............... 251/208

*Primary Examiner*—A. Michael Chambers
*Attorney, Agent, or Firm*—Kalish & Gilster

[57] ABSTRACT

A compact gas flow control valve has a valve body having an inlet for receiving gas pressure, to provide gas at a substantially constant delivery pressure to be delivered by the gas flow control valve, and an outlet for delivery of the gas. Flow rate of the delivered gas is controlled by a rotor. A flow control plate covering the rotor has a plurality of orifices produced by one of various processes including mechanical drilling, laser drilling, piercing, punching, and selective etching. A selector mechanism orients the rotor to permit flow only through a selected one of said orifices at such delivery pressure for delivery by the outlet. The orifices define a preselected schedule of different flow rates determined by the diameter of the respective orifices.

9 Claims, 8 Drawing Figures

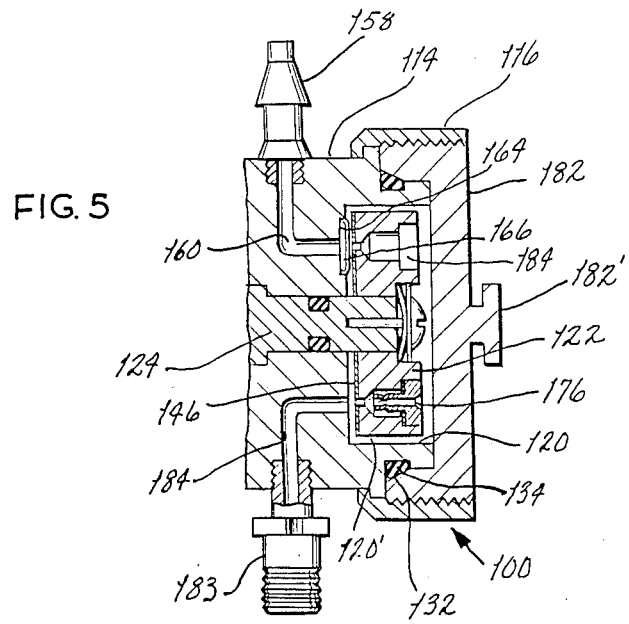
FIG. 5
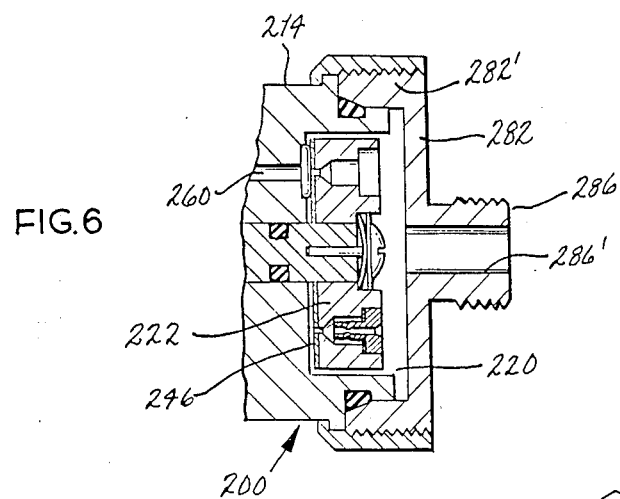
FIG. 6
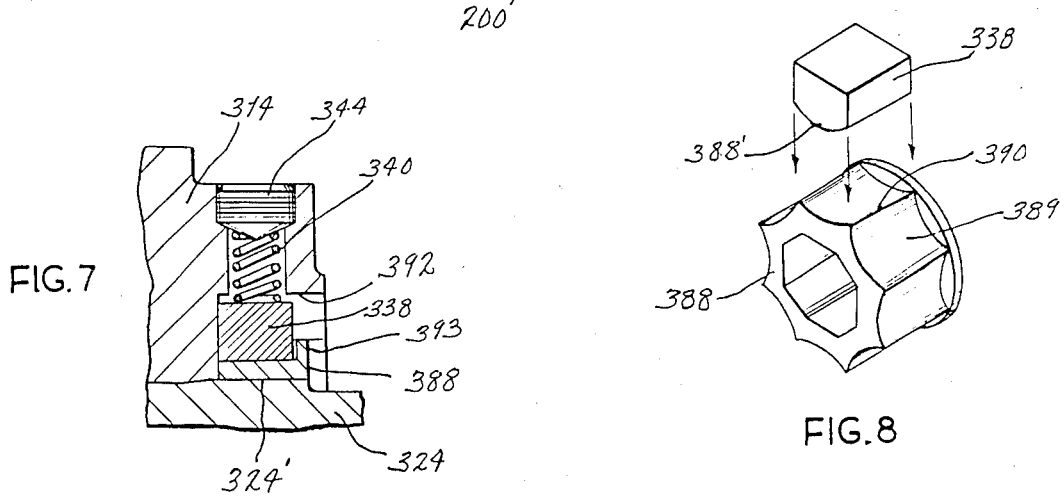
FIG. 7
FIG. 8

GAS FLOW CONTROL VALVE

This is a divisional application of Ser. No. 756,710 filed July 19, 1985.

BACKGROUND AND SUMMARY OF THE INVENTION

This invention relates to flow control devices and, more particularly, to a compact gas flow control valve of unusual simplicity and economy.

The invention is particularly concerned with controlling the flow of oxygen from a source of regulated pressure at a desired, constant flow rate as dictated by medical requirements, such as for emergency treatment, and for hospital, clinical and other uses, including domestic therapeutic personal usage as for treatment of chronic conditions. In these different kinds of usages, it may be required to deliver oxygen at a flow rate which may vary from very little, such as as low as 0.25 liters per minute, up to approximately 15 liters per minute. Hence it is desired to allow ready preselection of a desired flow rate.

Medical professionals in insitutions or other users of such equipment may have different preferences as to the minimum and maximum volumetric flow rates which such apparatus should provide. Further, different users are expected to have different preferences as to the available sequence of flow rates.

For example, one user may prefer a control sequence of 0.5, 0.75, 1, 1.5, 2, 3.5, etc., liters per minute; whereas another user may prefer a sequence of 1, 2, 4, 6, 8, etc., liters per minute, so that the design of such apparatus is rendered difficult for all intended modes of usage. Although the use of vernier controls allowing infinite adjustmentsof flow rate has been proposed, in medical usage, it is preferred to be able to positively and rapidly allow selection only according to such a preferred sequence, thereby assuring rapid, error-reducing selection, as required in prompt emergency treatment and with only definite discreet control positions being available so as to preclude inaccurate settings in operative positions, and to obviate close visual monitoring of selections and flow rates.

In, coassigned Phlipot et al U.S. application Ser. No. 537,653, filed Sept. 30, 1983, now U.S. Pat. No. 4,572,477, a regulated gas flow control valve is disclosed for overcoming such problems and providing for selection of a precalibrated flow rate of oxygen from a constant delivery pressure according to a preferred schedule of delivery rates. Such gas flow control valve utilized a rotor having a plurality of orifice inserts spaced at arcuate intervals around the rotor, each insert being individually precalibrated to provide a fixed flow rate, and each insert being positioned within a respective recess of the rotor. While this arrangement provides extreme accuracy as well as the capability of conveniently establishing a preselected schedule of different flow rates to be selected by rotation of the rotor, the process of manufacturing and calibrating the individual orifice inserts is more time consuming and expensive than desired.

Accordingly, it is an object of the present invention to provide a compact gas control valve of improved economy and simplicity, as well as being much more easily manufactured and eliminating or reducing the time heretofore required for calibration of gas flow rates provided by the valve.

It is a further object of the invention to provide such an improved flow control valve which is particularly intended for controlling the flow control of oxygen delivered from a source thereof, such as from a high pressure oxygen cylinder.

It is also an object of the invention to provide such a gas flow control valve which allows definite, positive selection only of a desired one of a plurality of available flow rates, precluding inaccurate or indefinite settings, in operative selector positions, and eliminating need for close visual monitoring or the control valve or flow rates provided thereby.

It is additionally an object of the present invention to provide such a gas flow control valve which allows and facilitates rapid changing of a flow control member to establish a different flow control sequence of available flow control rates, thus allowing ready selection of a preferred schedule of flow, i.e., delivery rates.

Among other objects of the present invention are the provision of such a gas flow control valve which is of extremely compact, streamlined and efficient construction, being both reliable and long lasting in usage as well as relatively light in weight.

Briefly, a gas flow control valve of the invention includes a single valve body having within it a valve member in the form of a rotor which carries a very thin flow control plate having orifices of a precise diameter provided therein. The orifices may be provided by one of various processes, including mechanical drilling, laser drilling, piercing, punching or selective etching.

Other objects and features will be in part apparent and in part pointed out hereinbelow.

BRIEF DESCRIPTION OF THE DRAWINGS

FIG. 5 is a longitudinal cross-sectional view of relevant portions of a further embodiment of a gas flow control valve of the invention.

FIG. 6 is a similar longitudinal cross-sectional view of portions of yet another embodiment of the new gas flow control valve.

FIG. 7 is a fragmentary longitudinal cross-section of portions of a gas flow control valve having a modified detent mechanism.

FIG. 8 is an exploded perspective view of elements of the detent mechanism of FIG. 7.

Corresponding reference characters indicate corresponding parts throughout the views of the drawings.

DESCRIPTION OF THE PREFERRED EMBODIMENT

Figure 1:
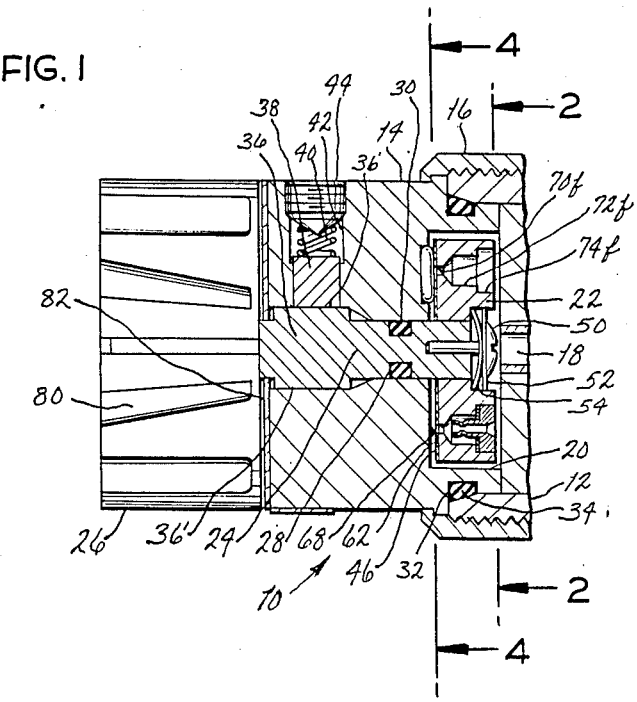
FIG. 1 is a longitudinal cross-sectional view of relevant portions of a gas flow control valve in accordance with and embodying the present invention.
Figure 2:
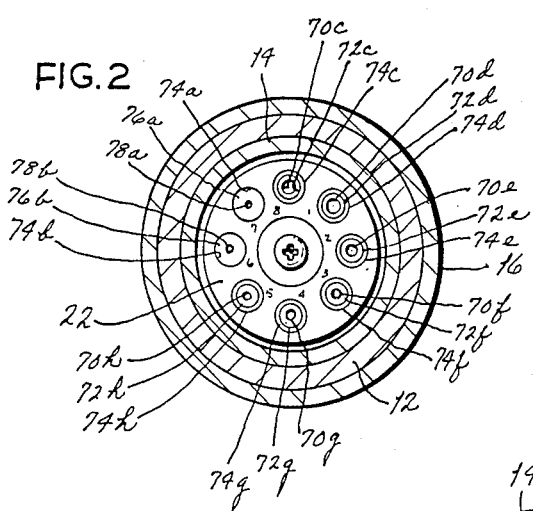
FIG. 2 is a lateral cross-section as taken along line 2—2 of FIG. 1.

Referring now to the drawings by reference numerals, illustrated generally at 10 are relevant control portions of a compact gas flow control valve of the invention. Valve 10 is especially designed and intended for providing oxygen flow control, and may be a flcw control valve per se or a regulated gas flow control valve as shown in the above-described Phlipot et al U.S. application Ser. No. 537,653 which is herein incorporated by reference. Such flow control valve may be utilized to provide a predetermined sequence of oxygen flow rates from a substantially constant delivery pressure of 5-50 p.s.i.g. If the flow vlave 10 is of the regulated type shown in said application, it may be attached to an oxygen cylinder (not shown) or other high pressure source of gas as, for example, at 500-3000 p.s.i.g.

The new control valve is espically suited for delivery of oxygen for emergency, chemical and hospital use, as in ambulances, emergency rooms and other medical facilities, as well as being useful for controlling oxygen flow for personal use, as for treatment of chronic conditions with oxygen supplied by ambulatory, portable and stationary sources. The control valve is useful additionally for controlling the dispensing of other gases, such as specialty gases within the medical, scientific and other commercial fields.

If of the type shown in the above-noted patent application, valve 10 is mounted at one end of a cylindrical regulator body 12, and includes its own cylindrical body 14 mounted by a threaded ring 16 to body 12. Thus, valve body 14 can be easily removed from body 12 for purposes explained below. Body 14 is formed, for example, of aluminum alloy, stainless steel, brass as well as various possible other materials, and is entirely compact and small in dimension such as having a diameter of about 3.5 cm.

If valve 10 is utilized as a part of regulated flow control apparatus described in the above-identified Phlipot et al application, body 12 thereof includes a pressure regulating assembly as described in said application. However, valve 10 may also be of the type having only flow control components, being supplied externally with a source of oxygen or other gas at a regulated pressure within the range of 5-50 p.s.i.g. If of the type having an internal regulator, as noted, the regulating mechanism will provide regulation of the pressure.

For the latter type, valve 10 is provided with a pressure inlet 18 by which the pressure-regulated oxygen or other gas is made available to flow control components of the new valve. Thus gas inlet 18 provides gas at a substantially constant delivery pressure to be delivered by valve 10 according to a preselected schedule of available gas flow delivery rates.

Valve body 14 includes a cylindrical recess or cavity 20 in which there is located a rotor 22. The rotor is cylindrical, being thus of circular plan and is mounted for being rotated within cavity 20 about an axis defined by a shaft 24 by manual actuation of a relatively large knob 26.

In order to assure of gas tight relationship, shaft 24 is provided with an annular recess 28 in which is seated an O-ring seal 30. Further, the valve body 14 is provided with an annular recess 32 having an O-ring 34 for providing a sealing relationship with the main valve body proper 12.

Shaft 24, which extends coaxially through the cylindrical valve body 14 is seen to include a portion 36 of octagonal section to provide cam surfaces as at 36' against which a pawl 38 is urged by spring 40 within a bore 42 secured by a screw 44 to provide a positive detent mechanism for shaft 24 so that there are eight positions established for rotation of knob 26, each corresponding to a desired gas flow rate or for no flow at all.

Figure 3:
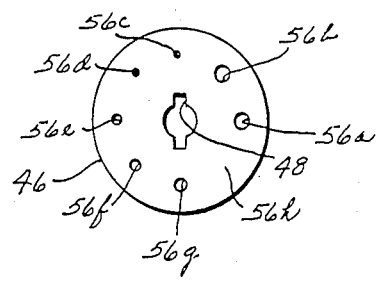
FIG. 3 is a plan view of a flow control plate having etched orifices in accordance with the present invention, as utilized in the flow control valve of FIG. 1.

Seated under rotor 22 is a circular flow control plate 46, as shown in plan in FIG. 3 in exaggerated size. Rotor 22 includes a keyway 48 by which it is keyed to shaft 24, being secured to the shaft by fastening means such as a screw 50 beneath which are a pair of washers 52, 54, the latter of which may be a Belleville type spring washer so as to provide means for resiliently urging rotor 22 toward the floor of cavity 20.

As is shown in FIG. 3, flow control plate 46 is provided with a plurality of circular apertures 56a-g of diameters chosen for providing the preselected gas flow delivery rate to be established by the rotation of selector knob 26. There is also provided a blank position 56h established by flow control plate 46 which will correspond to an "off" position at which no gas flow is provided.

Figure 4:
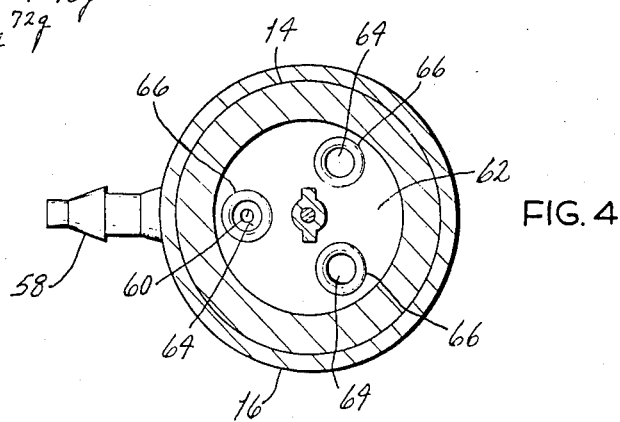
FIG. 4 is a lateral cross-section taken along the stepped line 4—4 of FIG. 1.

Referring to FIG. 4, the outer portion of body extension 14 is provided with an outlet fitting 58 threaded to the valve body extension and communicating to a passage 60 opening into the lower or outer side of cavity 20 for communication with the rotor and for receiving the gas flow permitted by the orientation of rotor 22 as provided by knob 26.

In order to assure of gas tight relationship against the proximal face of plate 46, the cavity floor, as designated at 62, is provided with three shallow cylindrical recesses 64 in which are seated respective O-rings 66 for providing a sealing relationship with the rotor and plate. The O-rings bear against the proximal plate face 68 in equispaced, balanced relationship. However, passage 60 opens only into one of said cylindrical recesses 64, so as to receive oxygen or other gas only through a predetermined one of the orifices of the flow control plate 46 will be delivered to outlet fitting 58. The spring washer 54 resiliently urges plate face 68 against the O-rings to prevent any leakage, thereby ensuring that only a single orifice will establish the desired flow rate. An oxygen line such as for supplying oxygen to a patient oxygen mask or nasal cannula may be connected to fitting 58.

Referring again to FIG. 1, the rotor is provided with eight apertures 70a-h each of the same size which open from flow control plate 46 into respective cavities or or ports 72a-h of relatively larger diameter, which in turn have enlarged diameter portions 74a-h to provide the stepped configuration shown in FIG. 1. Alternatively, the apertures 70a-h may extend completely through the rotor with a constant diameter, but the stepped port configuration illustrated is useful for a perticular purpose shortly to be described. Such apertures 70a-h are not flow limiting, it being preferred instead to utilize flow control plate 46 for this purpose. Such plate is preferrably of very thin stainless steel such as of a few thousandths of an inch thickness, most preferrably 0.003-0.004 in. Such a thin metal plate can be formed economically as by punching discs from a roll of sheet material having a finely polished surface such that the surface of the completed flow control plate will provide an extremely high quality, essentially leakproof sealing relationship when engaged sealing members within the completed valve.

The flow control plate apertures 56a-g are each preferrably formed by one of several processes so their dimensions determine the different flow rates to be made available by rotation of rotor 22 according to the preselected schedule which is preferred, such as for example, to provide flow rates of 0.5, 1, 1.5, 2, 2.5, 3 and 4 liters per minute (LPM), but with no aperture being formed at position 56h, there being provided thus a rotor position providing no flow of oxygen or other gas. The process for providing such apertures may be selected from the following group of processes: mechanical drilling, laser drilling, piercing, punching and selective etching. In the case of etching, such process comprises the following steps:

If flow rates of extremely low values, such as as little as 0.5 LPM or conceivably less, are to be provided and if etching is used for manufacturing, the etching process controls must be so tightly adhered to that, for manufacturing convenience and to save time, it may be preferred to utilize one or two orifice inserts of the type disclosed in above-described Phlipot et al patent application Ser. No. 537,653. Therefore, against such a contingency, the stepped port configuration for the rotor is desirable, for such precision inserts fitted into the rotor. For example, two such inserts 76a, 76b are shown, each having a precisely fixed orifice 78a, 78b to establish the desired flow rate where it must be so specifically limited. Such inserts are placed into their respective cavities in tightly fitted relationship and preferrably are staked in place.

Further, the use of such orifice inserts may be required where a flow control plate has been manufactured in quantity according to a preferred schedule of flow rates, but where only one flow rate of the schedule must be varied from the norm. In these cases, the precision inserts are placed only in the rotor ports where needed, while the flow is to be determined by other positions is controlled by the precision etched orifices of the flow control plate.

In the flow control plate shown in FIG. 3, relatively large apertures 56a, 56b are shown located therein and these are at positions which correspond to those of the rotor which have received respective precision orifice inserts 76a, 76b. In such case, apertures 56a, 56b are large enough not to interfere with or limit the flow through the orifice inserts.

The new construction thus makes available hitherto unachievable flexibility for the manufacturer, in that the flow control plate providing a desired flow rate schedule can be very easily manufactured in quantity, and flow control plates can be changed readily, as by loosening of said ring 16 and removing the valve body extension 14 to gain access to the rotor 22 and its flow plate 46, and such components are thus easily changed and replaced by components providing the new flow rate schedule. The precision etching process is extremely accurate as well as being reproducible to provide large quantity with extreme precision from one flow plate to the next, and saving considerable time not only during the assembly of the new flow control valve, but also in verifying that it provides highly accurate flow rates.

The user may conveniently select the desired flow rate by rotation of knob 26, which is positively detented by the means described above. Knob 26 preferably includes a deep notch 80 for permitting observation of an index plate 82 on which there are indicated the various possible flow rates to be provided. A band 82' also shows flow rates.

Preferably, knob 26 may include provisions as described in the above-identified Phlipot et al patent application for limiting its rotation between arcuate limits, thereby allowing medical personnel to configure the flow control valve so that oxygen flow may be limited only within a prescribed range and thereby preventing the patient from selecting an oxygen flow level which would be harmful. Accordingly, the patient maximum flow rate, as well as minimum flow rates, may be prescribed if desired.

The new flow control valve as described herein provides a simplicity, accuracy and economy heretofore unmatched and achievable.

Referring to FIG. 5, a modified version 100 of the new valve is illustrated, having a body portion 114 of cylindrical form but closed at the knob-remote end by a base or cover portion 182 in the form of a flanged circular disc secured by a ring 116. Sealing between disc 182 and body portion 114 is provided by an O-ring 134 fitted within a seat 132. Thus, disc 182 completely seals the knob-remote end of body portion 114. It may include a button-like flanged extension 182' whereby the entire valve 100 may be received by a conventional clip (not shown) such as the type utilized for retaining a microphone when the same is not being used. This permits valve 100 to be clipped to a structure immediately proximate the user, who is being supplied by oxygen at a flow rate determined by valve 100. Or, it may be instead secured to the body of the user, who may carry the clip attached to an article of clothing. Thus, in the case of aircraft crew or passengers who are each supplied by oxygen controlled by such valve 100, each user may select an oxygen delivery rate appropriate to an altitude being flown, such as thus appropriate for use in unpressurized aircraft.

Gas, such as oxygen, at regulated pressure is supplied through a fitting 183 which is threaded into body 114 and communicates through a passage 184 to cavity 120.

Passage 184 opens into the floor of cavity 120 which is configured as in the embodiment of FIGS. 1-4. Also shown in FIG. 6 is passage 160 which opens (in the same manner as passage 60 shown in FIG. 4) into a recess 164 containing an O-ring 166, all as previously described in connection with embodiment 100, to permit delivery of the desired flow rate by means of outlet fitting 158.

In all other respects, valve 100 is like valve 10, the rotor 122 being selectively positioned by rotation of shaft 124 by the previously described knob.

The pressure-regulated gas is permitted to flow around rotor 122, such as in the space designated 120' between the side wall of cavity 120 and corresponding periphery of rotor 122.

In the same manner as for valve 10, the oxygen or other gas may flow through only a predetermined one of the orifices in flow control plate 146 or else through a precision orifice insert, such as shown at 176 and, thus, into passage 160 for delivery.

Although the flow has been described in the direction as from inlet fitting 183, through valve 100 and out through outlet fitting 158, a valve of the invention makes possible also flow control by reverse flow. Accordingly, inlet fitting 183 may be present in the position of outlet fitting 158, and the latter then being located at the illustrated position of inlet fitting 183. In this mode, gas will flow from the regulated source through inlet 160, and then through flow control plate 146 for delivery by passage 184.

Referring now to FIG. 6, an alternative embodiment 200 of the new valve is illustrated, having a body 214 of cylindrical form closed at the knob-remote end by a base 282 in the form of a circular plate having a threaded peripheral flange 282' and including a central threaded extension 286 including a central bore 286' providing a passage for gas flow relative to cavity 220. A rotor 222 of the same configuration as in the embodiment of FIG. 5 is rotatable within the cavity for selecting a desired flow rate. Only passage 260 communicates to the cavity on the flow control plate side of rotor 222. If fitting 286 is provided with gas such as oxygen under regulated pressure, a predetermined flow rate will be established by rotor 222, as rotated by shaft 222 to bring a preselected orifice of the flow control plate 246 into registry with passage 260.

As in the embodiment of FIG. 5, valve 200 exhibits bidirectional properties whereby passage 260 may be either the inlet passage or the outlet passage.

Thus, the embodiments of FIGS. 5 and 6 offer hitherto unavailable flexibility to the designer of equipment requiring flow control valve, such as particularly oxygen distribution facilities in hospitals, clinics, and the like, as well as for equippage of portable oxygen units. The coaxial placement of fitting 286 is particularly advantageous since the valve body 214 may be rotated as desired for ultimate equipment configuration. Additionally, the designer has available an alternative concerning the presentation of the flow control knob, which may be presented for rotation by either a horizontal axis or a vertical axis, etc.

Referring to FIGS. 7 and 8, a modified version of detent portions of the new valve are shown. Of course, a flow control knob (as shown in FIG. 1) provides rotation of shaft 324. The body 314 is modified to allow a sleeve 388 to be fitted upon the flatted portion of shaft 324, which portion as designated at 324' is of octagonal character if utilized to provide eight positions for rotation of the knob for flow control purposes. Sleeve 388 is provided with a periphery of star-like character including arcuate receses, as at 389, separated by sharp cusps, as at 390. A modified detent or pawl 338 having an outwardly convex engaging surface 388' is provided for engagement of said recesses, being so urged by a spring 340 retained by a screw 344. Detent 338 is easily inserted during assembly by movement into a formed recess 392 and, when so located as shown in FIG. 7, is retained by a flange 393 formed at the outer end of sleeve 388. Sleeve 388 is in turn retained on shaft by close frictional fit as well as by the use of an indicia plate like that shown at 32 in FIG. 1 and by the selector knob.

The arcuate character of each of the receses 389, as separated by the sharp edges or cusps 390 from adjacent recesses, causes very positive detenting to occur upon rotation of the knob. Further, the correspondingly convex detent surface 339' causes not only very high stability in a detented position but also instability if resting upon a cusp 390, whereby shaft 324 is urged toward a position of stability wherein detent 338 is positively seated in a corresponding recess 389.

Sleeve 388 permits modification of the new flow control valve to provide for any number of desired detented positions, it being apparent that sleeve 388 may be removed and replaced by another sleeve having another number of detenting positions, and differing possibly also from the number of flats provided by the octagonal flatted portion 324 of the shaft. Hence, a valve according to the invention which is initially designed to provide for eight flow control positions can readily be configured during manufacture for providing instead 9, 10, 12, etc. or any selected number of flow control positions, the rotor being comparably configured for providing the corresponding number of flow control orifices.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A compact gas flow control valve comprising a valve body having a first, rotor cavity-defining portion and a second cover portion covering the rotor cavity, at least one of the body portions including inlet means communicating with the rotor chamber for receiving gas under pressure for providing the gas to the rotor chamber, at least one of the body portions including outlet means for delivery of the gas by the flow control valve, a rotor within the rotor cavity, the rotor including a flat surface, a flow control plate carried by the rotor, the flow control plate covering and lying against the flat surface of the rotor, the rotor having ports opening through said rotor surface, the ports being of sufficiently large size as not to limit the flow of said gas therethrough, the flow control plate comprising a thin, flat metal disc provided with a plurality of gas flow control orifices extending therethrough and spaced circumferentially around the disc and in registry with respective ones of the ports, the rotor being of substantially greater thickness than the disc, the gas flow control being of different sizes and passage means for providing communication between the outlet means and at least a selected one of the flow control plate orifices, selector means for orienting said rotor to permit flow only through selected flow control plate orifices and a corresponding rotor port for delivery by the outlet means, the flow control plate being removably secured to said rotor for thereby being replaceable, the flow control plate orifices defining a preselected schedule of different flow rates determined by the dimension of the respective orifices, and securement means detachably securing the body portions together but permitting selective removal of the second portion from the first portion for providing ready access to the flow control plate, whereby the flow control plate may be replaced for providing a different such preselected schedule of flow rates.

2. A gas flow control valve according to claim 1 further characterized by the rotor, rotor cavity and flow control plate each being circular, the passage means opening into the rotor cavity proximate a face of the rotor, seal means associated with said passage means, and means resiliently biasing the rotor for contact of a face of the flow control plate with said seal means.

3. A gas flow control valve according to claim 2, further characterized by the rotor cavity opening toward the body second portion, the rotor cavity having a floor, the rotor having an inner face which faces said floor and an outer face which faces the body second portion, the fluid control plate being carried on the inner face of the rotor, the passage means opening through the rotor cavity floor.

4. A gas flow control valve according to claim 3, further characterized by the rotor cavity floor defining at least one recessed portion receiving an o-ring seal constituting the seal means, the passage means opening through the o-ring seal.

5. A gas flow control valve according to claim 4, further characterized by the valve body second portion constituting a cover for the rotor cavity, a gas seal between the first body portion and cover, the securement means comprising a ring providing threaded inter-engagement for securing the cover in gas right relationship with the first body portion by pressure against the gas seal.

6. A gas flow control valve according to claim 5, further characterized by the ring being carried by the first body portion, the cover and ring each being threaded for mutually threaded engagement.

7. A gas flow control valve according to claim 5, further characterized by the inlet means communicating with the rotor cavity through the cover.

8. A gas flow control valve according to claim 5, further characterized by the inlet means communicating with the rotor cavity by passage means in the first body portion opening through the cavity floor.

9. A gas flow control valve according to claim 8, further characterized by the cover including a button-like flanged outer extension for permitting securement of the valve by a user to other structure.

* * * * *